(12) United States Patent
Saegusa

(10) Patent No.: US 11,580,318 B2
(45) Date of Patent: *Feb. 14, 2023

(54) TAG READING SYSTEM

(71) Applicant: TOSHIBA TEC KABUSHIKI KAISHA, Tokyo (JP)

(72) Inventor: Shinji Saegusa, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,497

(22) Filed: Sep. 27, 2021

(65) Prior Publication Data

US 2022/0012440 A1    Jan. 13, 2022

Related U.S. Application Data

(63) Continuation of application No. 16/911,375, filed on Jun. 24, 2020, now Pat. No. 11,157,709.

(30) Foreign Application Priority Data

Sep. 6, 2019    (JP) .............................. JP2019-163102

(51) Int. Cl.

| G06K 7/00 | (2006.01) |
| G06K 7/10 | (2006.01) |
| G06K 19/077 | (2006.01) |
| H01Q 1/22 | (2006.01) |
| H04B 5/00 | (2006.01) |

(52) U.S. Cl.
CPC ... *G06K 7/10316* (2013.01); *G06K 19/07749* (2013.01); *H01Q 1/2216* (2013.01); *H04B 5/0062* (2013.01)

(58) Field of Classification Search
CPC ............. G06K 7/1036; G06K 7/10089; G06K 7/10009; G06Q 20/208; G07G 1/009
USPC ............... 235/439, 383, 385, 462.46, 472.02
See application file for complete search history.

(56) References Cited

U.S. PATENT DOCUMENTS

| 8,207,828 | B2 | 6/2012 | Hanebeck |
| 11,157,709 | B2* | 10/2021 | Saegusa ............ G06K 7/10316 |
| 2005/0234778 | A1 | 10/2005 | Sperduti et al. |
| 2014/0035734 | A1 | 2/2014 | Yamamoto |
| 2019/0026507 | A1 | 1/2019 | Sakurai |
| 2019/0311164 | A1 | 10/2019 | Teter et al. |

* cited by examiner

*Primary Examiner* — Daniel St Cyr
(74) *Attorney, Agent, or Firm* — Kim & Stewart LLP

(57) ABSTRACT

A tag reading apparatus comprises a passage that is configured to receive an RFID-tagged article that is to be registered in a transaction. The passage has an inlet end and an outlet end separated from each other in a first direction and width in a second direction. An antenna is in the passage at a position between the inlet and outlet ends in the first direction. An RFID reader is provided to read an RFID tag according to a response wave from the RFID tag received via the antenna. A controller is configured to identify the RFID-tagged article as being in the transaction according to a change in the response wave (such as a phase difference or intensity) corresponding to a movement of the RFID-tagged article from the inlet end to the outlet end.

16 Claims, 17 Drawing Sheets

FIG. 14
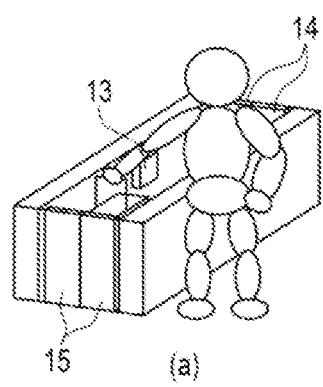
(a)
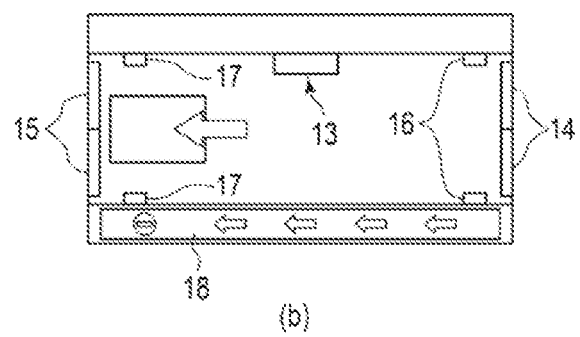
(b)

(a) (b)

TAG READING SYSTEM

CROSS-REFERENCE TO RELATED APPLICATIONS

This application is a continuation of U.S. patent application Ser. No. 16/911,375, filed Jun. 24, 2020, which is based upon and claims the benefit of priority from Japanese Patent Application No. 2019-163102, filed on Sep. 6, 2019, the entire contents of which are incorporated herein by reference.

FIELD

Embodiments of the present invention relate to a tag reading system.

BACKGROUND

In recent years, the need for self-checkout methods has been increased due to lack of manpower at retail stores and the like. One method of self-checkout operates by collective registering of all goods being purchased using an RFID tag (for simplicity, a "tag") on each item in the transaction. In such a method, a high power electromagnetic wave can be necessary to read each tag when a large number of articles/items are overlapped with each other in the article storage location such as a shopping basket or a bag. However, when the strength of the electromagnetic wave being output is increased, a distant tag can also be inadvertently read such that a tag or the like on a commodity outside the shopping basket (or the like) is much more likely to be read. For this reason, there has been proposed a structure in which tags are read in a tunnel that serves as an electromagnetic shield or tags are read from within a container having a lid closed.

However, the operation of passing through a tunnel or closing a lid every time a tag is read is troublesome. Even in the case where a tag is read in a tunnel or a container with a closed lid, there is still a possibility that some tag outside the tunnel or the container may be read due to unintended leakage of electromagnetic waves. Therefore, there is a demand for a tag reading system capable of reliably reading a plurality of tags in a commodity storage unit such as a basket or a bag with a simple configuration.

BRIEF DESCRIPTION OF THE DRAWINGS

FIG. 14 depicts (a) a basket at a front side of a door on an outlet side in an article registration system according to an embodiment and (b) a top view of the basket reaching the front side of the outlet side door.

DETAILED DESCRIPTION

According to an embodiment, a tag reading apparatus, comprises a passage that is configured to receive an RFID-tagged article to be registered in a transaction, such as a retail sales transaction. The passage has an inlet end and an outlet end separated from each other in a first direction. The passage has a width in a second direction perpendicular to the first direction. An antenna in is positioned in the passage between the inlet and outlet ends in the first direction. An RFID reader is configured to read an RFID tag according to a response wave from the RFID tag received via the antenna. A controller is configured to identify the RFID-tagged article as being in the transaction according to a change in the response wave corresponding to a movement of the RFID-tagged article from the inlet end to the outlet end.

Hereinafter, certain example embodiments will be described with reference to the accompanying drawings.

First, the configuration of an article registration system 1 including a tag reading system according to one embodiment will be described.

Figure 1:
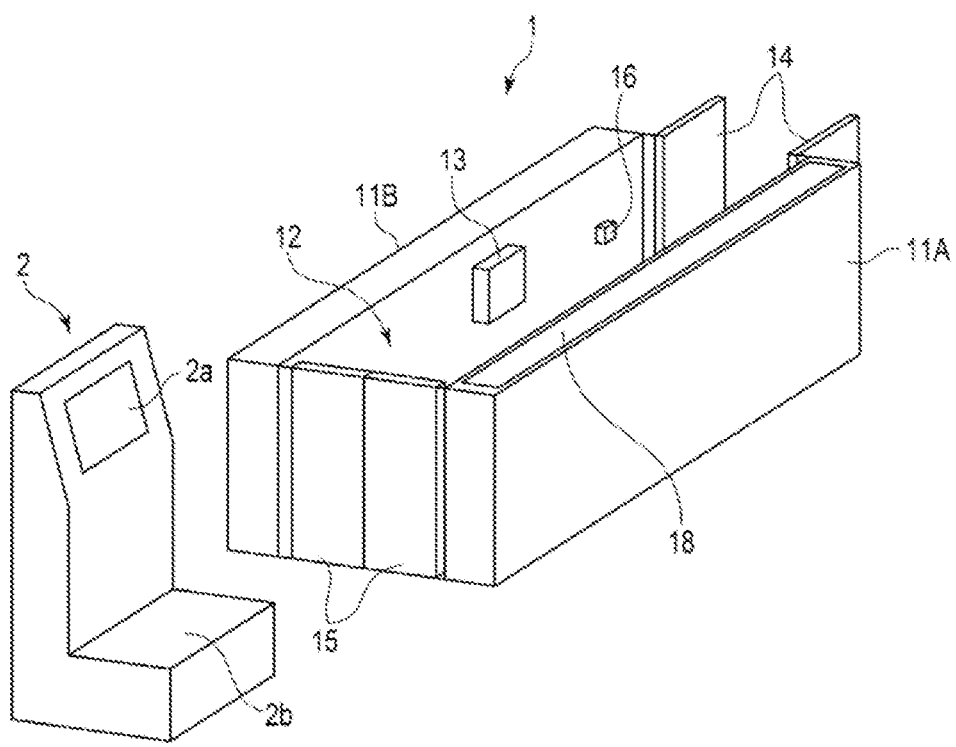
FIG. 1 is a perspective view schematically depicting an article registration system including a tag reading system according to an embodiment.
Figure 2:
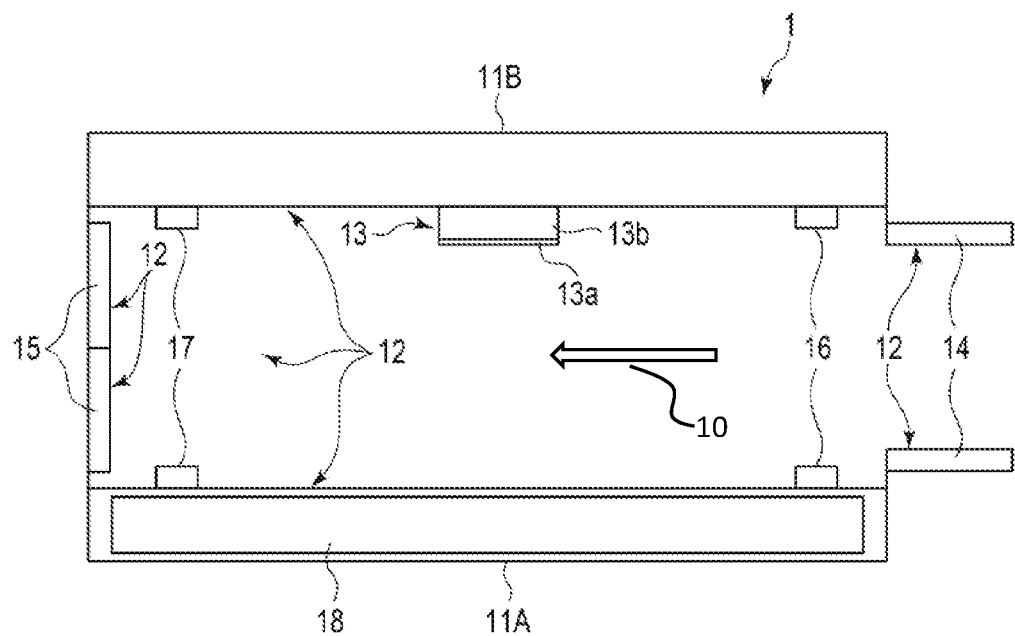
FIG. 2 is a top view schematically showing an example configuration of an article registration system according to an embodiment.

FIG. 1 is a perspective view illustrating an example configuration of a settlement system including an article registration system 1 and a settlement terminal 2 according to an embodiment. FIG. 2 is a view of an article registration system 1 as seen from above.

The article registration system 1 reads an RFID tag attached to an article, such as a commodity for sale at a retail store, and registers information of the article based on information read from the RFID tag. In this embodiment, the article registration system 1 reads an RFID tag attached to a commodity being stored in a commodity storage unit such as a bag (shopping bag) or a basket (shopping basket). The settlement system includes an article registration system 1 and a settlement terminal 2. The settlement terminal 2 is a device for executing settlement (payment) for the merchandise registered by the article registration system 1.

The article registration system 1 has walls 11A and 11B forming a slot 10 (also referred to as a passage 10) through which a commodity storage unit containing an RFID tag is passed. The slot 10 has an opening at the top. The slot 10 is configured so as to allow the user to pass a commodity storage unit (bag or basket) therethrough while still holding the commodity storage unit by hand, for example. In the configuration example shown in FIGS. 1 and 2, the slot 10 is formed by two walls 11A and 11B provided in parallel to each other.

The wall 11B may be an existing wall such as an exterior or internal wall or partition in the store. The article registration system 1 may be configured such that an existing wall or a newly installed wall is used as wall 11B, and antenna 13a, doors 14 and 15, sensors 16 and 17 shown in FIGS. 1 and 2 can be installed in the existing wall or the provided in the new wall.

Figure 3:
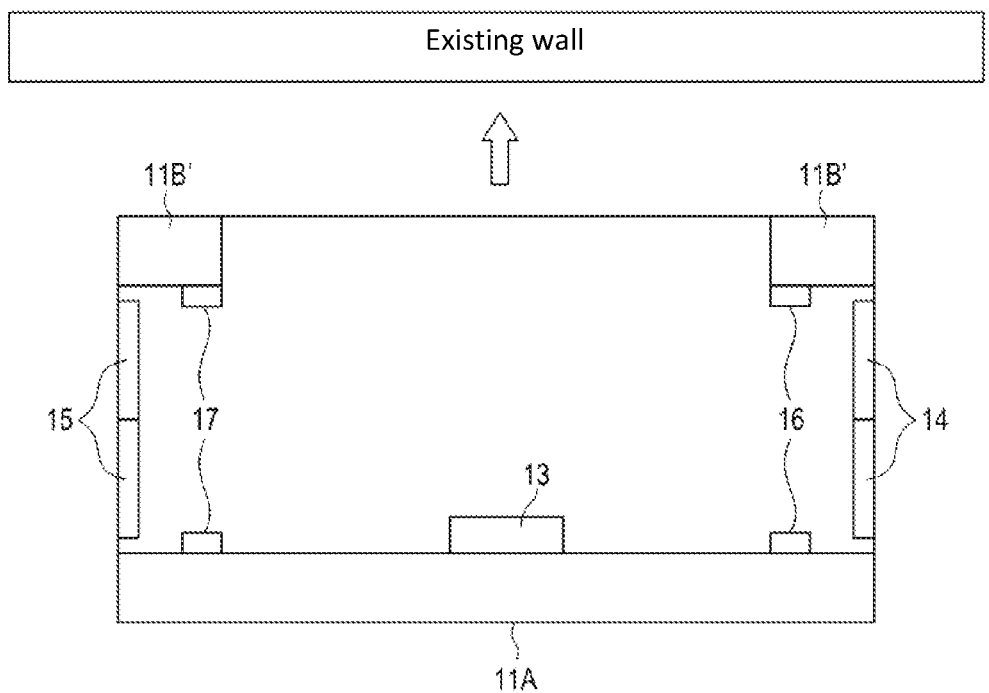
FIG. 3 is a top view schematically showing another configuration example of an article registration system according to an embodiment.

Furthermore, the article registration system 1 may be configured to be installed alongside an already existing store wall or partition. FIG. 3 is a diagram showing an example of the configuration of the article registration system 1 that it is installed along an existing wall. In the configuration example shown in FIG. 3, the article registration system 1 has a structure in which the reader 13 is attached to the wall 11A side as a unit. Furthermore, in the configuration example shown in FIG. 3, support members 11B' for supporting the doors 14 and 15 are provided. These support members 11B' also provide attachment points for arranging the sensors 16 and 17 as depicted. In the configuration shown in FIG. 3, the article registration system 1 can be configured by installing the support members 11B' onto the existing wall by physical attachment or merely adjacent to the existing wall by close placement. According to the configuration shown in FIG. 3, in the case where the existing wall is used, it is only necessary to push (see arrow) the various units and the existing wall together, so that installation may be simplified.

The interior of the slot 10 formed by the wall 11A, 11B and the floor surface is covered with a radio wave absorber 12. For example, in the configuration example shown in FIGS. 1 and 2, the radio wave absorber 12 is arranged on the walls 11A, 11B, and a floor surface forming the inner side of the slot 10. Furthermore, as shown in FIG. 2, the radio wave absorber 12 may also be disposed on the inner surface of the doors 14 and 15 in the slot 10.

The article registration system 1 also includes a reader 13, doors 14 and 15, sensors 16 and 17, a display 18, and the like.

The reader 13 is an apparatus for reading an RFID tag. The reader 13 includes an antenna 13a and a reader control unit 13b. The reader control unit 13b is connected to the antenna 13a, and the physical installation position of the reader control unit 13b is not limited to any specific position (that is, the reader control unit 13b can be separated from the antenna 13a with, for example, only a connecting wire or cable therebetween). In the configuration example shown in FIG. 1, it is assumed that the antenna 13a and the reader control unit 13b are integrally formed together as the reader 13.

The antenna 13a is disposed at a position where radio waves from an RFID tag moving within the slot 10 can be received. The antenna 13a is located inside the slot 10. In the configuration example shown in FIGS. 1 and 2, the antenna 13a is installed on the wall 11B so as to allow radio waves to be transmitted and received to and from the RFID tag in the slot 10. The antenna 13a is arranged near the center along the item moving direction in the slot 10 so that changes over time in the phase difference between the transmitted wave (or carrier wave) transmitted from the reader 13 and the response wave (or received wave or reflected wave) from the RFID tag occurring with the movement of the RFID tag along the slot 10 can be detected. However, in general, the antenna 13a does not need to be specifically centered along the length of the slot and various locations in the vicinity of the center along the length of the slot 10 can be adopted. Also, the antenna 13a may be provided on the wall 11A rather than wall 11B, for example. In this context, the phase difference is a deviation between a carrier wave transmitted from the reader 13 and a response wave (reflected wave) with which the RFID tag responds after receiving the carrier wave, and is indicated by an angle or a time difference.

The door 14 and the door 15 are provided at both ends of the slot 10. The doors 14 and 15 are opened and closed by the door controllers 22 and 23 (refer to FIG. 4). In this embodiment, it is assumed that the commodity storage unit enters the slot 10 from the door 14 and exits from the door 15. That is, the door 14 is an inlet door, and the door 15 is an outlet door.

The sensors 16 and 17 are sensors for detecting an object. The sensor 16 is provided in the vicinity of the inlet of the slot 10 as a detection position. The sensor 16 detects a commodity storage unit such as a shopping bag or a shopping basket which has entered into the slot 10. The sensor 17 is set in the vicinity of the outlet of the slot 10 as a detection position. For example, the sensor 17 is placed in front of the door 15 on the outlet side in the slot 10. The sensor 17 detects a commodity storage unit such as a shopping bag or a shopping basket which has moved to the vicinity of the outlet in the slot 10.

The display 18 displays the guidance to the user. The display 18 displays, for example, a movement direction and a stop direction. The display 18 may also include a display for displaying information about the read commodity or guidance of the settlement process by the settlement terminal 2 for the read commodity. For example, the display 18 may be a combination of a lamp for guiding a movement direction and a stop, and a liquid crystal display for displaying information by a character.

The settlement terminal 2 is a payment device that executes the settlement of the goods registered by article registration system 1. The settlement terminal 2 includes an operation panel 2a and a commodity table 2b. The operation panel 2a is composed of a display unit and a touch panel. The display unit of the operation panel 2a displays, for example, a settlement guide for a commodity. The touch panel is to input an operation for the user to perform settlement. The commodity table 2a is provided with a shopping basket, a shopping bag, or the like serving as a commodity storing section for storing the commodity that has passed through the slot 10.

Figure 4:
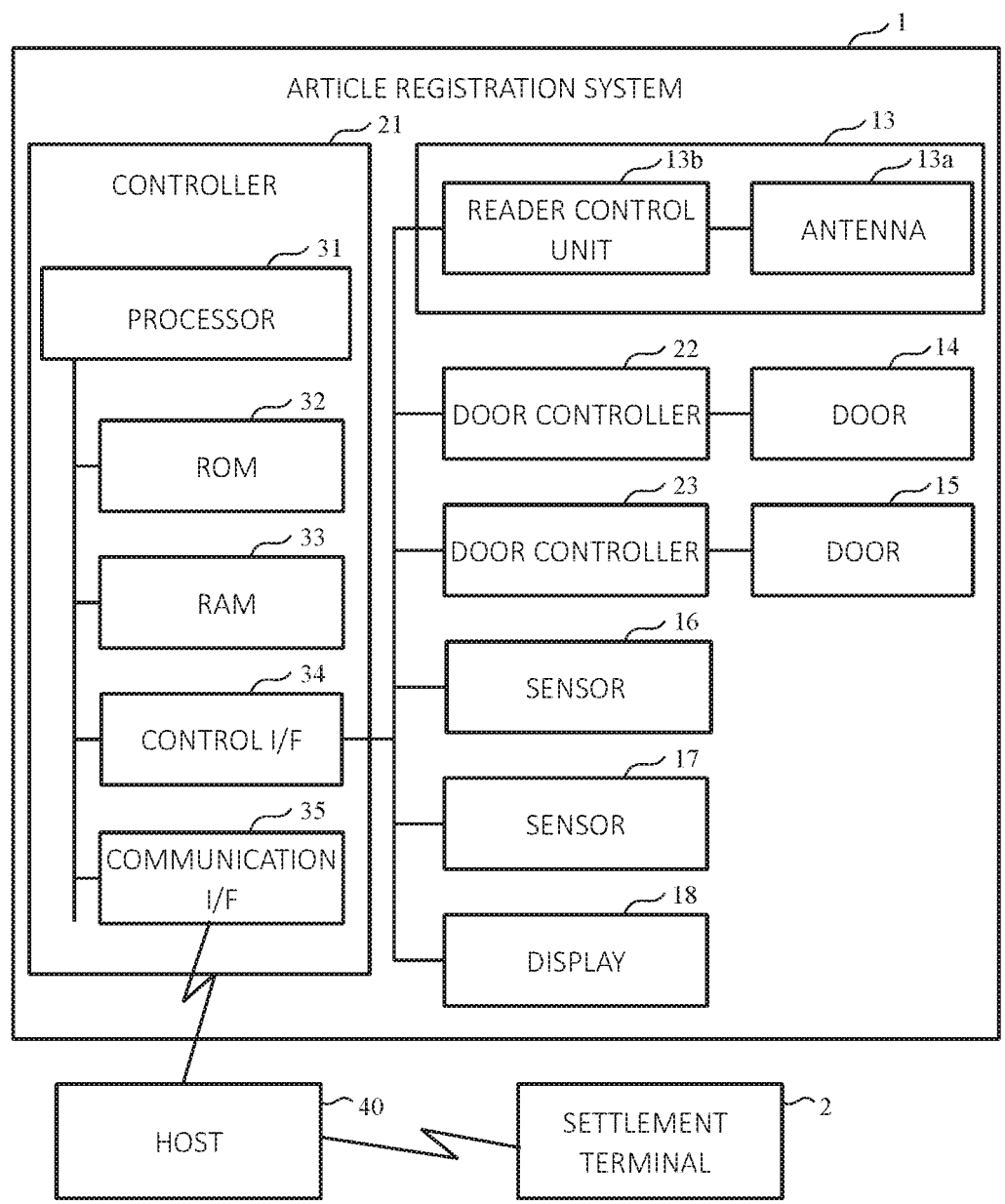
FIG. 4 is a block diagram depicting a control system of an article registration system according to an embodiment.

Next, the configuration of the control system in the article registration system 1 according to an embodiment will be described. FIG. 4 is a block diagram showing a configuration example of the control system of the article registration system 1.

As illustrated in FIG. 4, the article registration system 1 includes a controller 21, a reader 13, sensors 16 and 17, door controllers 22 and 23, a display 18, and the like. The controller 21 includes a processor 31, a ROM 32, a RAM 33, a control interface 34, and a communication interface 35.

The controller 21 is a device for controlling the entire article registration system 1. In the controller 21, the processor 31 executes the program stored in the ROM 32 to realize various kinds of processing. The ROM 32 stores a program. Furthermore, the ROM 32 may include a rewritable nonvolatile memory. The RAM 33 functions as a working memory for temporarily storing data.

The control interface 34 is an interface for connecting to the reader 13, sensors 16 and 17, the door controllers 22 and 23 and the display 18. The control interface 34 is configured by an interface corresponding to each of the devices. The processor 31 transmits and receives to and from the readers 13, the sensors 16 and 17, the door controllers 22 and 23 and the display 18 via the control interface 34.

The processor 31 controls the reader control unit 13b of the reader 13 via the control interface 34. For example, the processor 31 instructs the reader control unit 13b to execute the RFID tag reading process via the control interface 34. Further, the processor 31 acquires, via the control interface 34, information corresponding to the radio waves received from the RFID tag by the antenna 13a as a read result. The processor 31 stores the read result obtained from the reader 13 as log data in a memory such as the RAM 33.

The processor 31 also acquires the detection signals of the sensor 16 and the sensor 17 via the control interface 34. The processor 31 determines the presence or absence of an object in the vicinity of the inlet of the slot 10 based on the detection signal of the sensor 16 acquired through the control interface 34. The processor 31 determines the presence or absence of an object in the vicinity of the outlet of the slot 10 based on the detection signal of the sensor 17 acquired through the control interface 34.

The processor 31 controls the door controllers 22 and 23 via the control interface 34 to control the operation of the doors 14 and 15. Further, the processor 31 controls the display 18 via the control interface 34 to display various information.

The communication interface 35 is an interface for communication connection with an external device. In the configuration example shown in FIG. 4, the communication interface 35 serves as an interface for communication connection with the host 40. The processor 31 communicates with the host 40 via the communication interface 35. Here, the host 40 registers information about the commodity read by the article registration system 1. The host 40 determines the settlement amount for the registered product, and causes the settlement terminal 2 to execute the settlement. For example, the host 40 acquires information indicating an article read from the article registration system 1, and registers information about the acquired article as a product to be settled. The host 40 has a function of determining a settlement amount for the registered commodity, and executing settlement processing of the settlement amount in the settlement terminal 2.

The settlement terminal 2 executes settlement processing in accordance with information from the host 40. The user places the commodity storage unit such as a basket storing the commodity to which the commodity information is registered by passing through the slot 10, on the commodity table 2a of the settlement terminal 2. The user who places the basket on the commodity table 2a executes the settlement process by operating the operation panel 2a of settlement terminal 2. The settlement terminal 2 acquires information on the amount of payment for the merchandise registered by the article registration system 1 via the host 40. The settlement terminal 2 displays the obtained settlement amount on the operation panel 2a, and requests the user to settle the settlement amount. Thus, the settlement terminal 2 executes settlement processing according to the operation of the user.

Next, a description will be given of a processing for specifying the reading result of an RFID tag moved in the slot 10.

The reader 13 receives radio waves from the RFID tag by the antenna 13a. The reader 13 receives the radio waves as response waves output from the RFID tag to a carrier wave transmitted at a predetermined interval (period). When the RFID tag serving as the transmission source of the response wave moves, the phase difference of the radio wave received by the antenna 13a located at the fixed position varies. Generally, when the RFID tag approaches the antenna 13a, the phase difference of radio waves sequentially received by the antenna 13a is reduced. On the contrary, when the RFID tag is separated from the antenna 13a, the phase difference of radio waves sequentially received by the antenna 13a increases.

That is, it is possible to identify whether or not the RFID tag is moved in a predetermined direction in the slot by the phase difference of radio waves sequentially received by the antenna 13a located near the center in the slot 10. For example, it is assumed that a product with RFID tag is moved from an inlet port to an outlet port in the slot 10. In this case, since the RFID tag approaches the antenna 13a until it moves to the vicinity of the center, the phase difference of radio waves that the antenna 13a receives sequentially from the RFID tag is reduced.

The RFID tag moving in the slot 10 is moved in a direction away from the antenna 13a after the RFID tag makes its closest approach to the antenna 13a at the center (position of the antenna 13a) of the slot 10. As the RFID tag of the commodity moves away from the antenna 13a, the phase difference of radio waves received from the RFID tag by the antenna 13a begins to gradually be increased.

Therefore, when the RFID tag moves from the inlet to the outlet within the slot 10, the phase difference of radio waves received by antenna 13a begins to increase after first decreasing.

Figure 5:
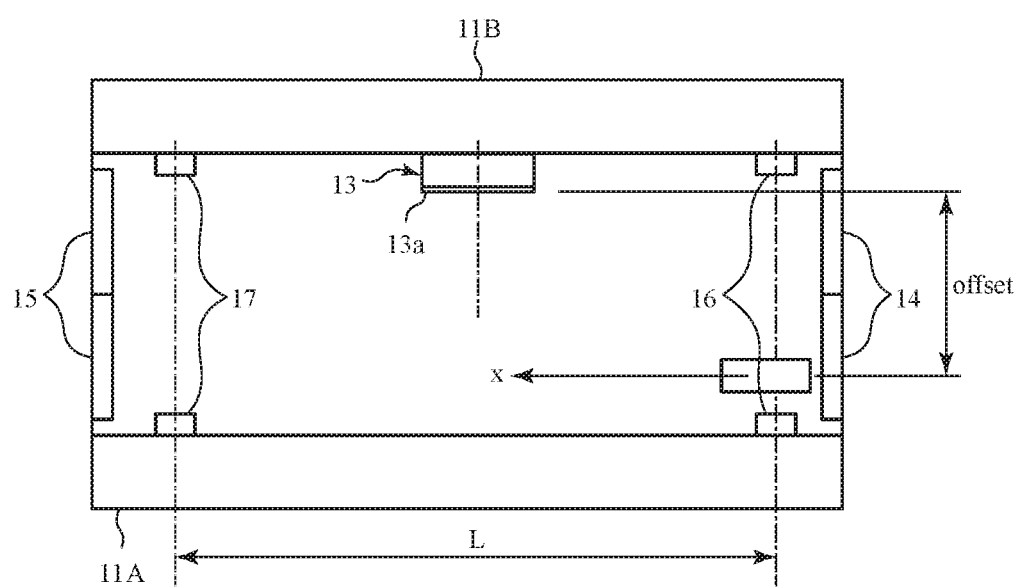
FIG. 5 is a diagram for explaining a relationship between an antenna and an RFID tag in an article registration system according to an embodiment.

FIG. 5 is a diagram for explaining the positions of the antenna 13a and sensors 16 and 17, and the moving direction of the RFID tags in an article registration system 1.

As shown in FIG. 5, the article registration system 1 reads the RFID tag as it moves along the length of the slot 10 (referred to here as the x direction) by using antenna 13a provided near the center of the slot 10 along the x direction. Also, as shown in FIG. 5, the distance in the direction orthogonal to the x direction between the RFID tag and the receiving surface of the antenna 13a is referred to as an offset. It is assumed here that the total distance between the sensors 16 and the sensors 17 is the distance L.

Figure 6:
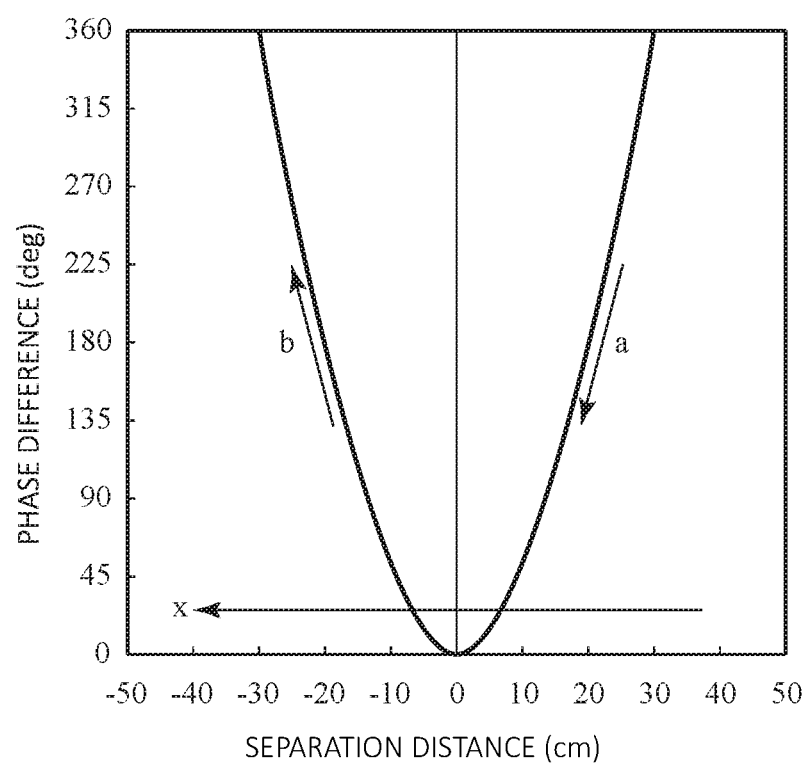
FIG. 6 is a diagram illustrating a relationship between a distance between an antenna and an RFID tag in an article registration system according to an embodiment and a phase difference between radio waves received by the antenna.

FIG. 6 is a diagram showing the relationship between the distance (separation distance) in the x direction between the antenna 13a and the RFID tag and the phase difference of the radio wave received by the antenna 13a. In the example shown in FIG. 6, the RFID tag is assumed to move at a constant speed in the x direction while within the slot 10, and the offset is set to approximately 20 cm.

As shown in FIG. 6, the phase difference of radio waves received from an RFID tag that moves at a constant speed in the x direction is rotated by ±180 degrees (360 degrees) about the position of the antenna 13a. For example, when the phase of the radio wave received by the antenna 13a changes from at least −180 degrees to +180 degrees or more, it can be determined that the RFID tag passing through the slot 10 has been read.

On the other hand, when the movement distance L of the RFID tag (commodity) in the slot 10 is short, this inversion of the phase difference and noise are difficult to separate. Therefore, a distance L is set to permit a detection that the phase has rotated by 360 degrees (±180 degrees around the antenna position) in accordance with the object movement detection from the sensor 16 on the inlet side to the sensor 17 on the outlet side. However, in general, the rotation angle of the phase per unit movement distance is different depending on offset (that is, the distance from antenna 13a in the direction orthogonal to the x direction). In the configuration shown in FIG. 5, the width of the slot 10 is the maximum possible value of the offset. Therefore, it is assumed that the distance L can be set in consideration of the width of the slot 10 as the maximum offset.

Figure 7:
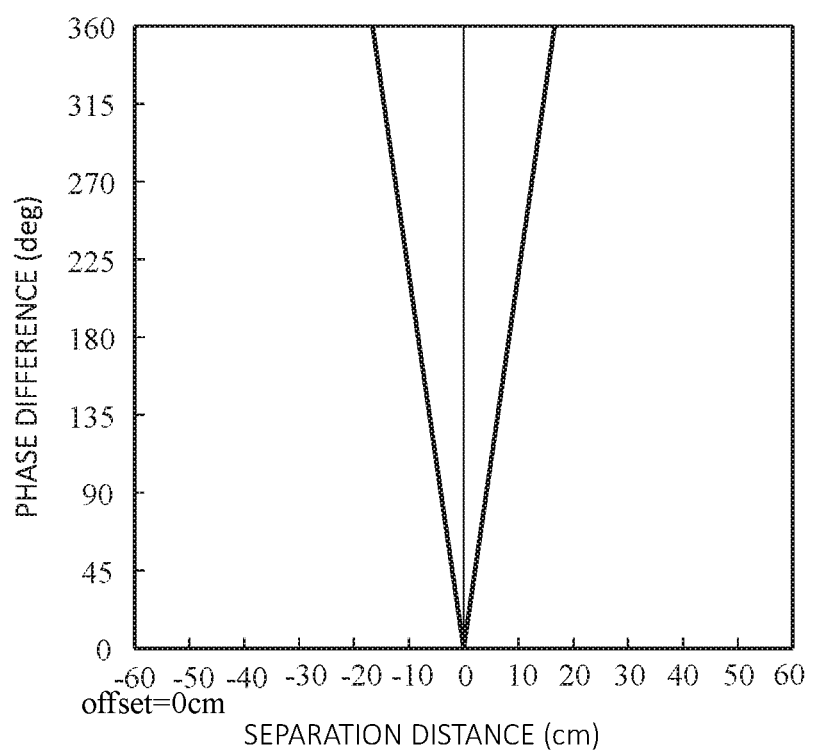
FIG. 7 is a diagram illustrating a relationship between a separation distance and a phase difference due to an offset in an article registration system according to an embodiment.
Figure 8:
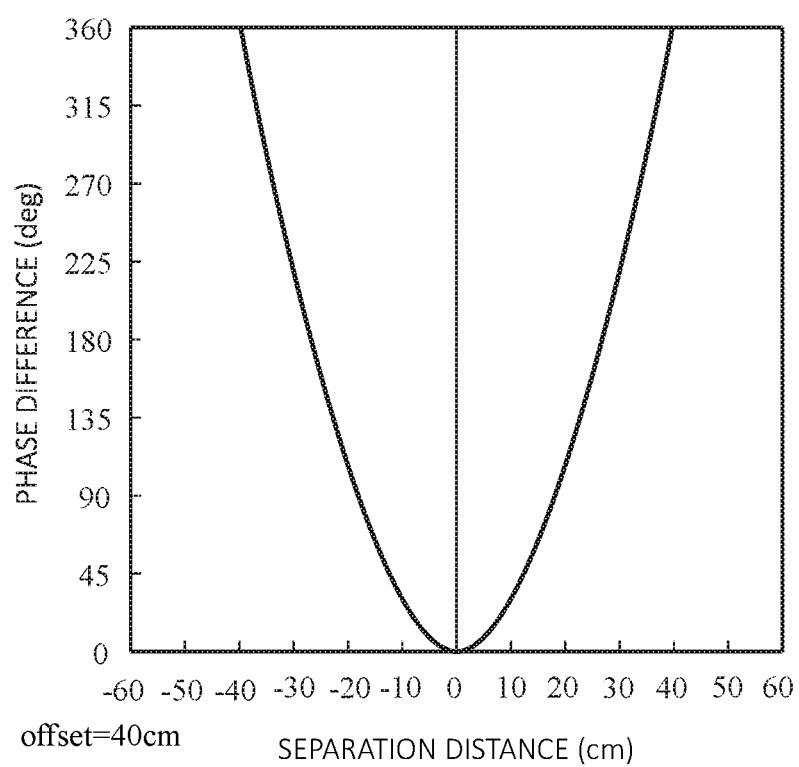
FIG. 8 is a diagram illustrating a relationship between a separation distance and a phase difference due to an offset in an article registration system according to an embodiment.
Figure 9:
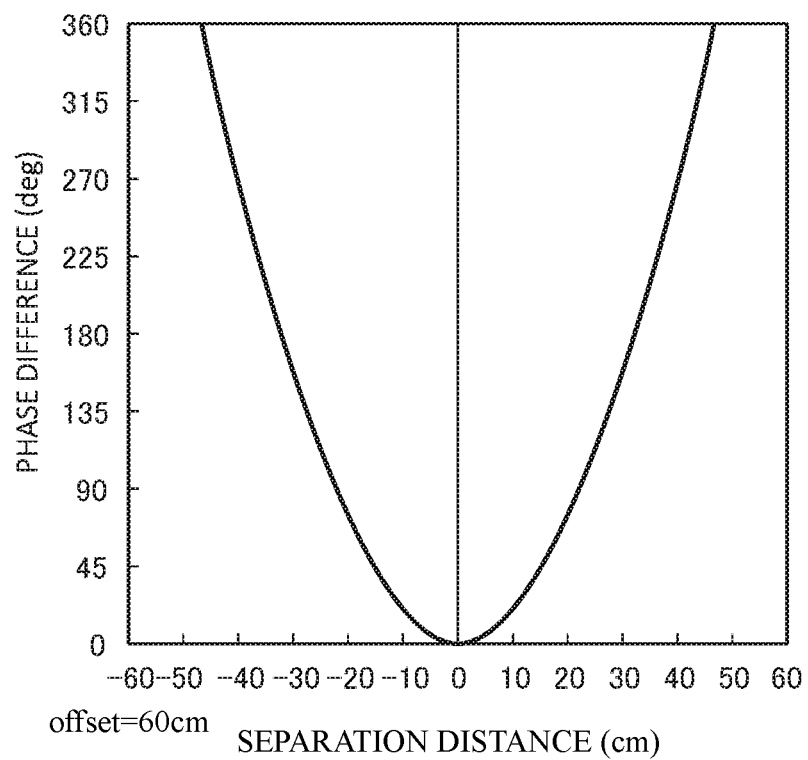
FIG. 9 is a diagram illustrating a relationship between a separation distance and a phase difference due to an offset in an article registration system according to an embodiment.
Figure 10:
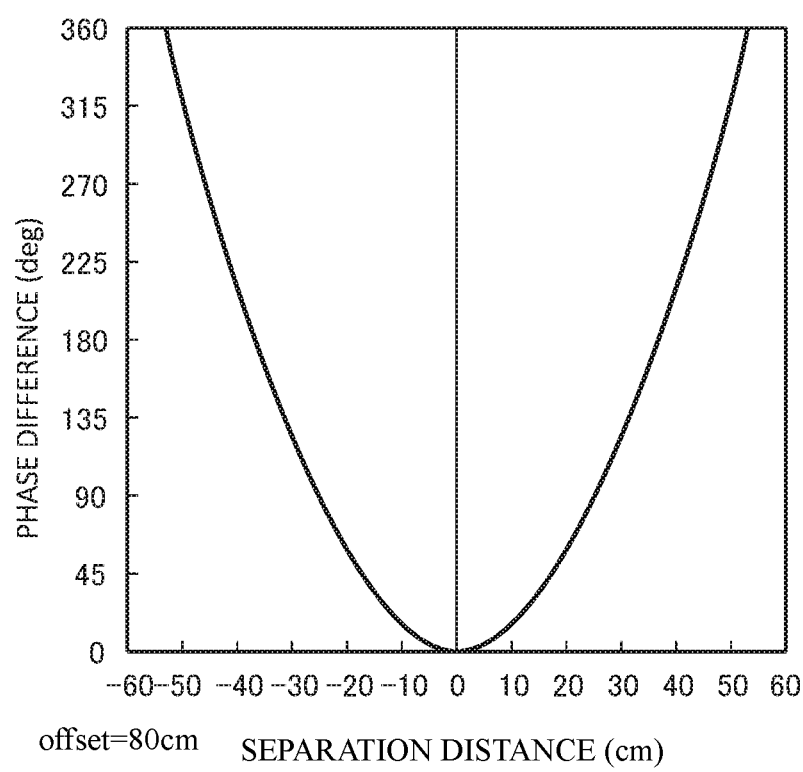
FIG. 10 is a diagram illustrating a relationship between a separation distance and a phase difference due to an offset in an article registration system according to an embodiment.
Figure 11:
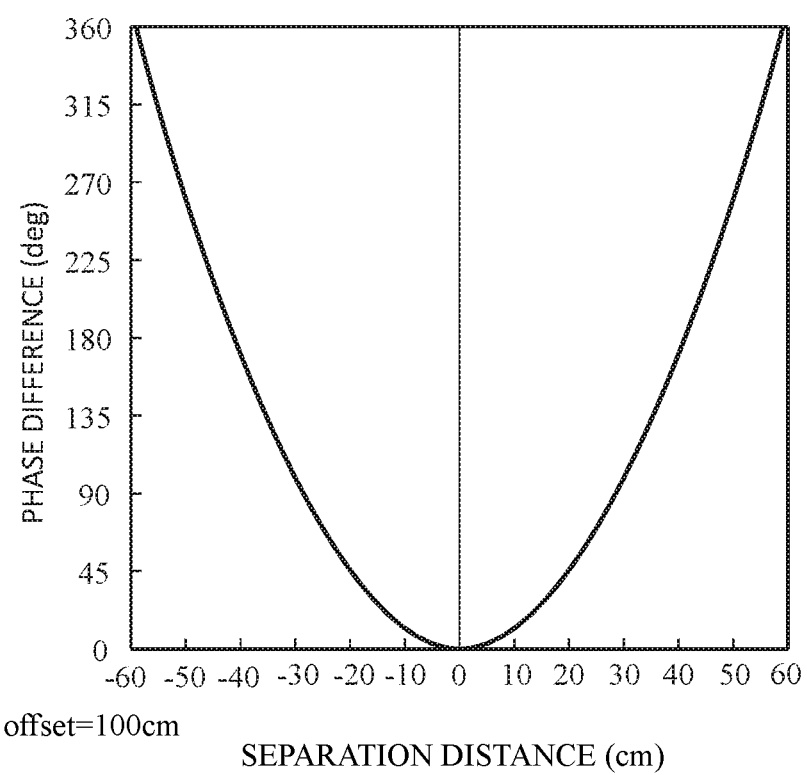
FIG. 11 is a diagram illustrating a relationship between a separation distance and a phase difference due to an offset in an article registration system according to an embodiment.

FIGS. 7 to 11 are diagrams showing the relationship between the distance between the antenna 13a and the RFID tag and the phase difference at various offsets. FIG. 7 is a diagram showing the relationship between the separation distance and the phase difference when offset is 0 cm. FIG. 8 is a diagram showing the relationship between the separation distance and the phase difference when offset is 40 cm. FIG. 9 is a diagram showing the relationship between the separation distance and the phase difference when offset is 60 cm. FIG. 10 is a diagram showing the relationship between the separation distance and the phase difference when offset is 80 cm. FIG. 11 is a diagram showing the relationship between the separation distance and the phase difference when offset is 100 cm.

According to the examples shown in FIGS. 6 to 11, the rotation angle of the phase per unit movement distance tends to be small in the case where the offset is large. In the configuration shown in FIG. 5, when the user moves the RFID tag (or more specifically the product on which the tag has been placed) within the slot 10, the maximum offset corresponds to the width of the slot 10. Therefore, the distance L may be designed as a function of maximum offset (width of the slot 10).

Next, the leakage of radio waves from slot 10 will be described.

When the slot 10 is made to have a low impedance (metal or the like), an electromagnetic wave for reading the RFID tag is blown out from the upper part of the slot 10 output from the reader 13. When an electromagnetic wave leaks out of the slot 10, the reader 13 may also read the RFID tag attached to the commodity outside the slot 10. On the other hand, it is known that when the inside of slot 10 is covered with a radio wave absorber, there is an effect of suppressing scattering at the edge portion and reducing the emission of radio waves from the slot 10. Therefore, in the article registration system 1, the inner side surface and the floor surface of the slot 10 are covered with a radio wave absorber. Thus, the article registration system 1 reduces the blowing of radio waves from within the slot 10, and prevents the RFID tag out of the slot 10 from being read.

Next, the operation of an article registration system 1 including a tag reading system according to an embodiment of the present invention will be described.

Figure 12:
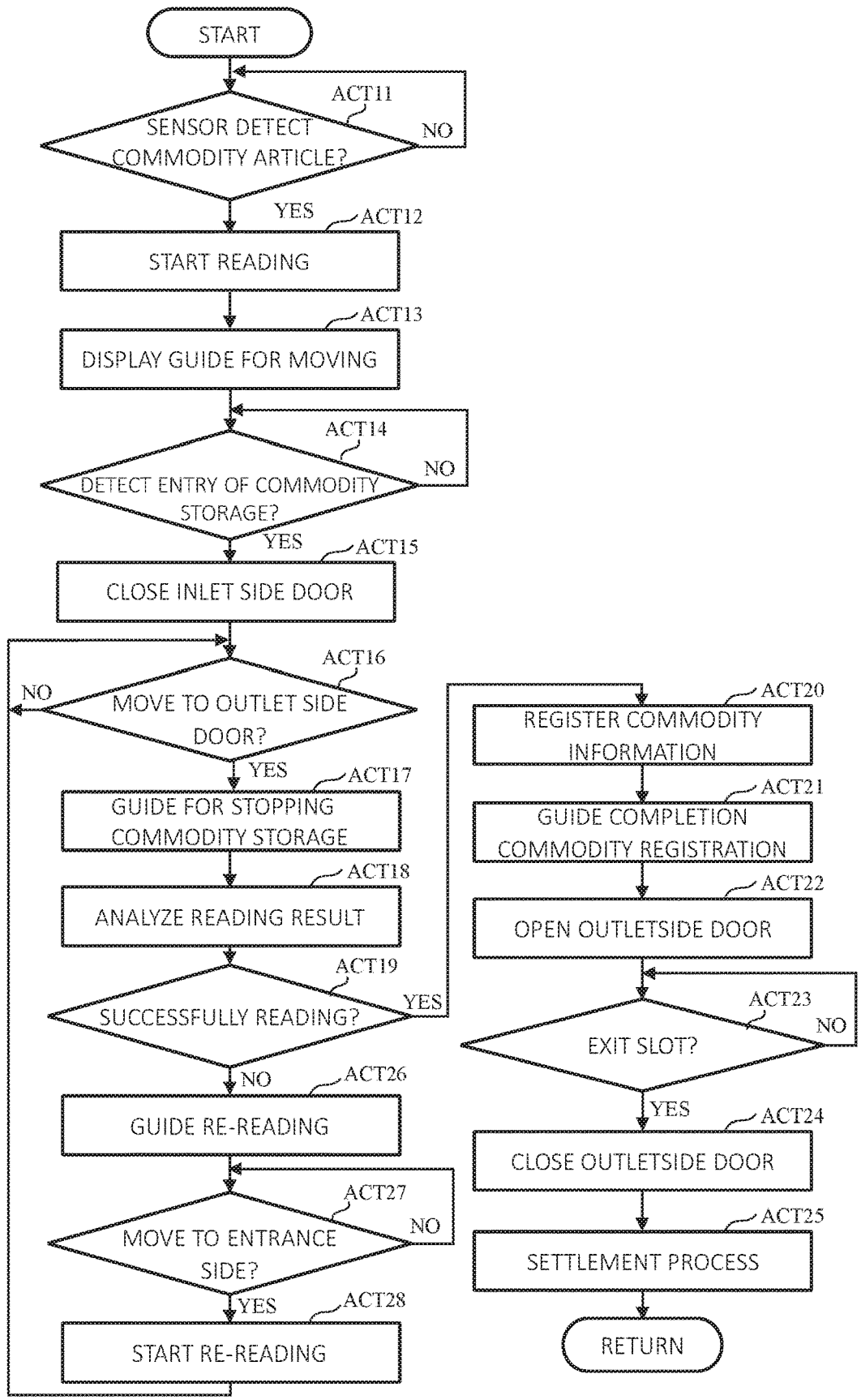
FIG. 12 is a flowchart of an operation example of an article registration system according to an embodiment.

FIG. 12 is a flowchart for explaining operations of the article registration system 1.

The controller 21 monitors the detection signal of the sensor 16 as a first sensor (inlet side sensor), and monitors whether or not a commodity storage unit (object) has entered into the slot 10. When the sensor 16 detects the commodity storage unit (ACT 11, YES), the controller 21 starts reading by the reader 13 (ACT 12). The reader 13 transmits radio waves including a response request, and receives a response wave including ID information from an RFID tag receiving the radio waves, thereby executing reading processing of the RFID tag.

After the reading is started, the reader 13 repeatedly executes the RFID tag reading (radio wave reception from the RFID tag) at a predetermined cycle. The controller 21 stores the read result of the RFID tag acquired by the reader 13 at a predetermined cycle as read data over time (log data) in a memory such as the RAM 33. The controller 21 analyzes the mobile state of the RFID tag by the phase difference of the radio waves received by the reader 13 from the RFID tag. Therefore, the reader 13 supplies the controller 21 with a reading result including information such as product ID information indicated by the received radio wave and information indicating the phase difference between the radio waves sequentially received from the RFID tag during reading.

When the sensor 16 provided on the inlet side detects an article (ACT 11, YES), the controller 21 performs guidance for moving the merchandise storage unit held by the user in a predetermined direction in the slot 10 by the display 18 (ACT 13). For example, the display 18 displays a mark indicating the direction of travel. Further, the display 18 may guide by text such as "Please go slowly". The guidance may be performed by voice or the like instead or in addition to a text display.

Figure 13:
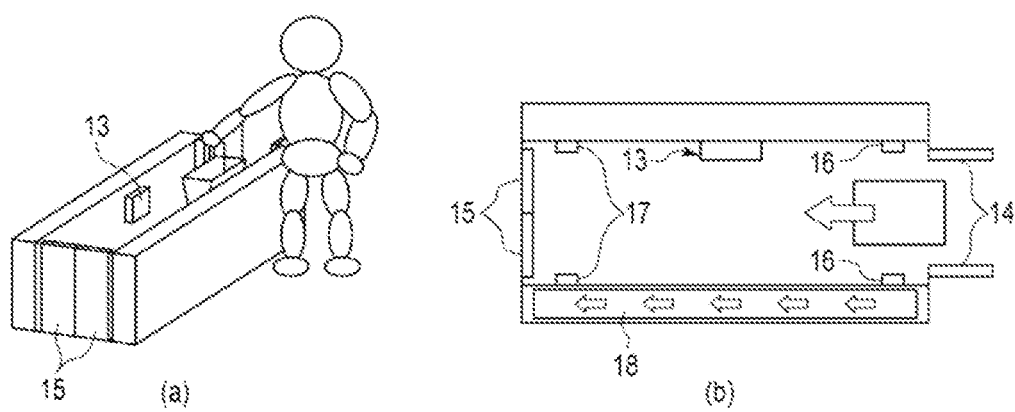
FIG. 13 depicts (a) a basket passing through a door on an inlet side in an article registration system according to an embodiment and (b) a top view when the basket passes through the door on the inlet side.

FIG. 13, part (a) is a diagram showing a state in which a basket serving as a commodity storage unit containing an RFID tag has been inserted into the slot 10. FIG. 13, part (b) is a top view showing the same state.

In the example shown in FIG. 13, part (b), display 18 provided on the top surface of the wall 11A displays arrows for indicating the correct movement direction of the basket serving as the commodity storage unit.

Furthermore, after detecting the entry of the commodity storage unit by the sensor 16, the controller 21 determines the timing for closing the door 14 (ACT 15). The controller 21 closes the door 14 after the commodity storage unit has completely entered the slot 10. For example, the controller 21 determines that the door 14 is to be closed when the commodity storage unit detected by the sensor 16 completely enters into the slot 10 (when the door 14 has been completely passed through). However, the controller 21 may also or instead close the door 14 in response to an instruction from the user.

When it is determined that the door 14 has been passed (ACT 14, YES), the controller 21 closes the door 14 by the door controller 22 (ACT 15). By closing the door 14, it is possible to prevent the commodity storage unit of a subsequent user from entering into the slot 10 at the same time as the present user. Furthermore, by closing the door 14, leakage of electromagnetic waves from within the slot 10 can also be reduced.

The controller 21 may start reading the RFID tag(s) by the reader 13 after the door 14 is closed. In this case, the controller 21 may instruct the reader 13 to start reading the RFID tag(s) after the door 14 has been closed by the door controller 22. Thus, the reader 13 can perform reading processing of the RFID tag(s) in a state in which the door 14 is closed.

Also, the controller 21 may execute reading start by the reader 13 or closing of the door 14 in response to an instruction from the user. In this case, the article registration system 1 is provided with a read start button for receiving the user's instruction, placed near a position such as on the wall 11A in the vicinity of the inlet. When reading is started according to the user's instruction, the article registration system 1 may perform reading in a state in which a plurality of commodity storage units (such as a plurality of boxes or a plurality of bags) are in the slot 10. As a result, the RFID tags on each of the commodities can be read collectively and attributed to a user (e.g., a customer) who stores a plurality of commodities in a plurality of commodity storage units, and a batch commodity settlement or the like can be realized at the same time.

After the door 14 on the inlet side is closed, the controller 21 monitors whether or not the commodity storage unit in the slot 10 has moved to the vicinity of the outlet (that is, to a position just before the door 15 on the outlet side) while continuing the reading process by the reader 13 (ACT 16). For example, the controller 21 determines whether or not the commodity storage unit has moved to the front of the outlet in the slot 10 depending on whether the sensor 17 on the outlet side detects the commodity storage unit. When it is determined that the commodity storage unit has moved to the front side of the outlet (ACT 16, YES), the controller 21 provides guidance, via display 18, requesting the stopping of movement of the commodity storage unit held by the user (ACT 17).

FIG. 14, part (a) is a diagram illustrating a state in which the commodity storage unit held by a user has reached the detection position of the sensor 17 on the outlet side of slot 10. FIG. 14, part (b) is a top view showing the same state.

As shown in FIG. 14, part (a), the user waits for completion of the commodity registration by stopping the basket (commodity storage unit) in front of the door 15 on the outlet side. As shown in FIG. 14, part (b), the controller 21 causes the display 18, which is provided on the top surface of the wall 11A, to display a stop/wait mark, while the door 15 at the outlet side is still closed.

Note that the display 18 may guide by text such as "Please wait a moment" or the like. Furthermore, such guidance may be performed by voice or the like. In addition, when the analysis of the commodity reading result and the settlement processing for the commodity can be executed instantaneously or quickly (that is, when the user is not required to stop), the stop guidance need not be performed.

When the controller 21 determines that the commodity storage unit has moved to the outlet (ACT 16, YES), the controller 21 analyzes the reading result by the reader 13 (ACT 18). The controller 21 confirms that the RFID tag, which has read the commodity information such as EPC including the ID information, has passed through the slot 10 by the analysis of the reading result. For example, the controller 21 confirms that the RFID tag attached to the commodity has passed through the slot 10 based on the log data as a result of reading by the reader 13. The controller 21 identifies information (article information such as EPC) read from the RFID tag that has been confirmed to have passed through the slot 10.

Here, the controller 21 identifies whether or not the RFID tag has moved within the slot 10 based on the temporal change with time of the radio wave received from the RFID tag in time series. As described above, the phase difference of radio waves received by the antenna 13a changes with the movement of the RFID tag along the slot 10. The phase difference of radio waves received by the antenna 13a near the center of the slot 10 will be reversed once the RFID tag passes through the center (midpoint along the length) of the slot 10. Conversely, the radio wave received from an RFID tag attached to the commodity that is presently outside the slot 10 does not similarly reverse in the inclination of the phase difference. Therefore, the controller 21 can determine that, among the reading results from the various RFID tags, only those in the results in which the phase difference has been reversed correspond to an RFID tag that has been moved within the slot 10.

The controller 21 thus determines whether or not the RFID tag attached to the commodity passing through the slot 10 has been successfully read by the analysis of the reading result of the reader 13 (ACT 19). When it is determined that the RFID tag cannot be read normally (ACT 19, NO), the controller 21 performs the re-reading of the RFID tag. When performing re-reading, the controller 21 instructs or guides the re-reading to be performed again (ACT 26). For example, the controller 21 displays the re-reading guidance on the display 18, such providing a message requesting the returning of the user and/or commodity storage unit to the inlet and passing the product(s) through the slot 10 again. Note that the controller 21 may keep the door 14 on the inlet side closed until the start of re-reading.

At the same time, the controller 21 detects whether or not the commodity storage unit in the slot 10 has moved to the inlet side (the start position of the re-reading) (ACT 27). For example, the controller 21 detects that the commodity storage unit has moved to the inlet side by detecting the commodity storage unit by the sensor 16 on the inlet side. When it is detected that the commodity storage unit has moved to the inlet side (ACT 27, YES), the controller 21 starts the re-reading of the RFID tag by the reader 13. For example, the controller 21 initializes the log data and executes the read process again by the reader 13 as a re-read process.

When it is determined that the RFID tag is normally read (ACT 19, YES), the controller 21 registers the commodity information including the ID information (e.g., a commodity code, electronic product code (EPC) or the like) read from the RFID tag to the host 40 (ACT 20).

When the commodity information is registered in the host 40, the controller 21 guides the user to completion of the commodity registration (ACT 21). For example, the controller 21 displays a message on the display 18 indicating that the registration of the commodity is completed. In this case, the controller 21 may display information including a list of commodities registered on the display 18. Furthermore, the controller 21 opens the door 15 provided on the outlet side of the slot 10 by the door controller 23 (ACT 22). In this case, the controller 21 may guide the completion of the commodity registration and may display exit guidance on the display 18 to remove the commodity storage unit from the slot 10.

Figure 15:
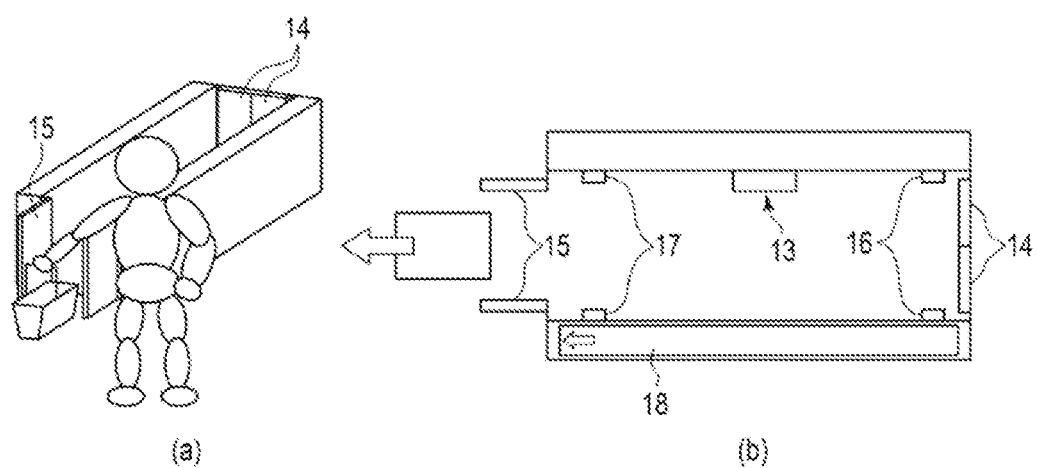
FIG. 15 depicts (a) a basket passed through a door on an outlet side in an article registration system according to an embodiment and (b) is a top view in which the basket has passed through the door on the outlet side.

FIG. 15, part (a) is a diagram showing a state in which a basket (commodity storage unit) is passed through door 15 on the outlet side of the slot 10. FIG. 15, part (b) is a top view showing the same state.

In the example shown in FIG. 15, part (b), the door 15 on the outlet side is opened, and a mark indicating that the commodity storage unit is allowed to pass out from the slot 10 is displayed on the display 18.

Once the door 15 on the outlet side is opened, the controller 21 monitors whether or not the commodity storage unit has completely exited the slot 10 based on the detection signal(s) from the sensor 17 (ACT 23). When it is detected that the commodity storage unit has completely exited the slot 10 (ACT 23, YES), the controller 21 closes the door 15 on the outlet side (ACT 24). In this case, the controller 21 may open the door 14 on the inlet side to accept the next user.

When it is detected that the commodity storage unit containing the registered commodity has completely exited the slot 10, the controller 21 causes the settlement processing for the registered commodity to be executed at the settlement terminal 2 (ACT 25). For example, the controller 21 notifies the host 40 that the commodity storage unit has exited the slot 10. The host 40 calculates a settlement amount or the like due for the purchase of the registered commodity (or commodities) in the commodity storage unit, and instructs settlement processing for the calculated settlement amount at the settlement terminal 2.

In some examples, the user places the commodity storage unit, which has passed through the slot 10 for commodity registration, on the commodity table 2a of the settlement terminal 2 which can be near the outlet of article registration system 1, and then performs settlement by using operation panel 2a. The settlement terminal 2 executes settlement processing according to the operation of the user for the registered commodity (or commodities) as instructed from the host 40. After settlement by the settlement terminal 2 is completed, the transaction for settlement for the items stored in the commodity storage unit is considered complete. Thus, together the host 40 and the settlement terminal 2 can be considered to function as a settlement system for performing settlement for the commodities registered by the article registration system 1.

According to the above-described processing, the article registration system 1 incorporates a tag reading system according to can confirm whether or not an RFID tag has passed through the slot 10 as part of an intended sales transaction. Moreover, the article registration system 1 can properly register commodity information as read from the RFID tags has passed through the slot 10, as information about the items/products/merchandise to be purchased in the sales transaction. Furthermore, by permitting user settlement of the sales transaction for those items/products/merchandise registered by the article registration system 1 at self-settlement type terminal or kiosk operated by the customer himself, it is possible to realize a settlement system capable of performing the transaction settlement without a store clerk.

Next, a first modification example of the article registration system 1 according to an embodiment will be described.

Figure 16:
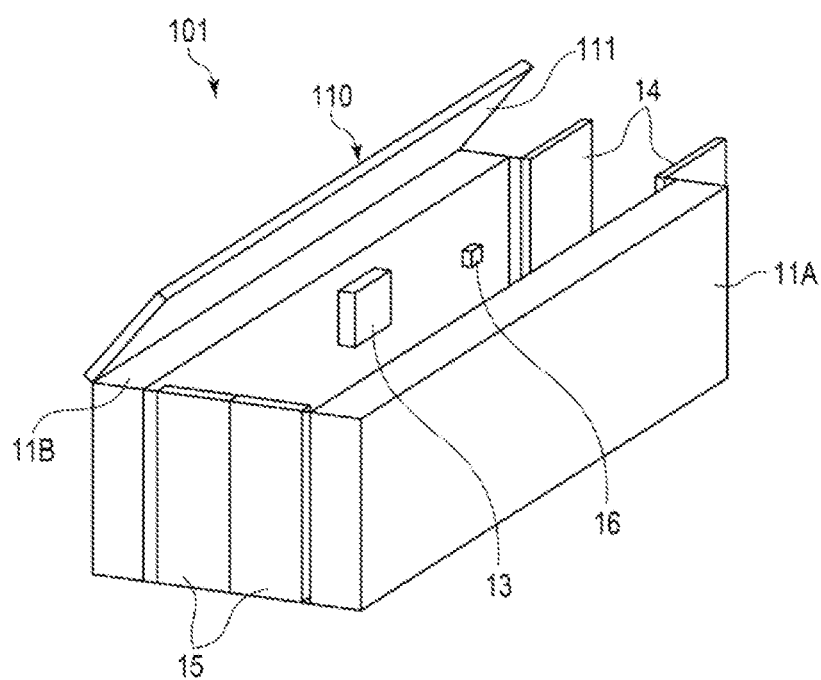
FIG. 16 depicts a first modification of an article registration system according to an embodiment.

FIG. 16 is a diagram showing a first modification of an article registration system according to an embodiment.

An article registration system 101 according to a first modification, as shown in FIG. 16, comprises a roof 111 provided with a radio wave absorber 110 in addition to the configuration of the article registration system 1 shown in FIGS. 1 and 2. For example, the roof 111 is disposed obliquely upward (angled) from the wall 11B so as to cover the opening above the slot 10. For example, the roof 111 is disposed obliquely upward from the wall 11B so as to at least partially cover the opening above the slot 10. A radio wave absorber 110 is provided inside the roof 111. Also, in the case where the wall 11B is formed of an existing wall, the roof 111 may similarly be installed on such an existing wall so as to cover a portion of the opening above the slot 10.

With such a structure, it is still possible to allow a user to move the commodity storage unit in the slot 10 in a state in which the commodity storage unit is held by the user. However, the radio wave absorber 110 can help reduce the leakage of radio waves from the slot 10. As a result, the article registration system 101 is less likely to erroneously read an RFID tag that is outside the slot 10.

Next, a second modification example of the article registration system 1 according to the embodiment will be described.

In the embodiment described above, an example has been described in which the movement of the RFID tag within the range of the slot 10 is detected by the above-described phase difference, however, the movement of the RFID tag may be detected in other methods. As a second modification, an example will be described in which the movement of the RFID tag within the range of the slot 10 is detected by a change in radio wave intensity.

Figure 17:
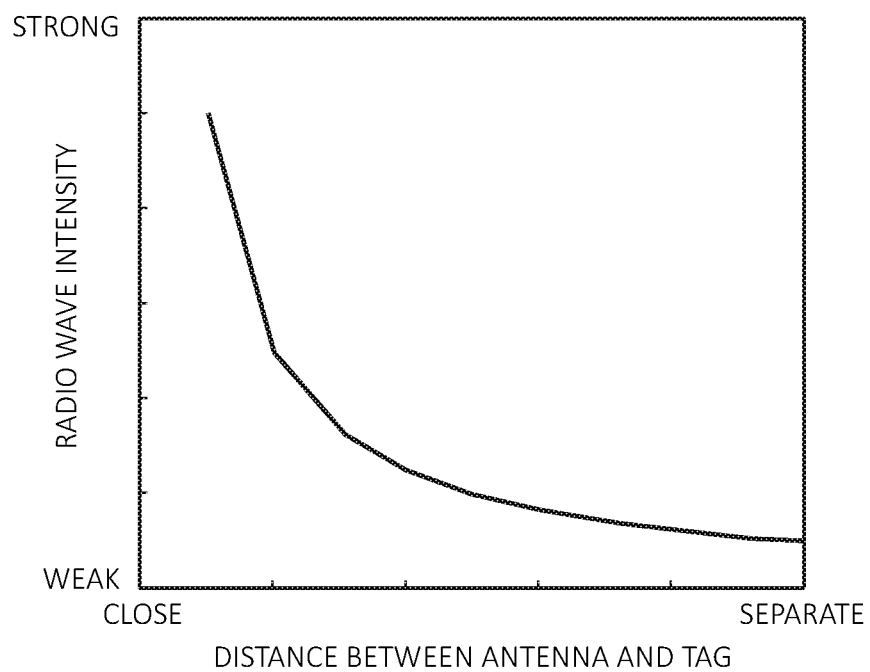
FIG. 17 is a graph showing the relationship between the distance between the antenna and the RFID tag and the radio wave intensity of the radio wave received from the RFID tag by the antenna.

FIG. 17 is a diagram showing the relationship between the distance between the antenna and the RFID tag being read and the radio wave intensity of the radio wave (response or return wave) received from the RFID tag by the antenna. As shown in FIG. 17, in general, when the antenna and the RFID tag are close to each other, the return wave intensity becomes stronger, and when the antenna and the RFID tag are distant, the return wave strength becomes weaker. Therefore, when it is assumed that antenna 13a is located near the center of the slot 10 as shown in FIG. 1, the return wave intensity received by the antenna 13a from the RFID tag attached to a commodity moving along the slot 10 length becomes gradually larger as the RFID tag (commodity) approaches the antenna 13a, and then, once the RFID tag passes the antenna 13a, the return wave intensity received by the antenna 13a from the RFID tag is gradually reduced.

For example, information (radio wave intensity information) indicating the field strength of radio waves received as a result of reading each RFID tag can be acquired, and when the radio field intensity information is graphed as a time series for each RFID tag, the movement of the RFID tag within the slot can be identified by changes in return wave intensity with time. In this case, the RFID tag, which corresponds to a graph having a single peak as a read result, can be determined to have passed through the slot 10. Therefore, the controller 21 may determine whether or not the RFID tag (or more importantly the product to which the RFID tag is attached) moves within the slot 10 based on the radio wave intensity information included in the reading result of each RFID tag.

In the embodiment described above, a description has been given of a case where a program to be executed by the processor is stored in advance in the memory within the apparatus. However, the program executed by the processor may be downloaded from a network to the apparatus, or may be installed in the apparatus from the storage medium. The storage medium may be a storage medium which can store a program such as a CD-ROM and which can be read by the apparatus. The function to be installed in advance or downloaded may be realized in cooperation with an OS (operating system) or the like inside the apparatus.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. These embodiments and variations thereof are included in the scope and spirit of the present disclosure and are included within the scope of the appended claims and their equivalents.

What is claimed:

1. A tag reading apparatus, comprising:
a passage through which a container storing an RFID-tagged article to be registered in a transaction can pass, the passage having an inlet end and an outlet end separated from each other in a first direction and a width in a second direction perpendicular to the first direction;
an inlet door at the inlet end of the passage;
an inlet sensor adjacent to the inlet door and configured to detect a presence of the container at the inlet end of the passage;
an outlet door at the outlet end of the passage;
an outlet sensor adjacent to the outlet door and configured to detect a presence of the container at the outlet end of the passage;
a roof by which an opening above the passage is at least partially covered and including a material capable of absorbing a radio wave;
an RFID reader having an antenna in the passage at a position between the inlet and outlet ends in the first direction; and
a controller configured to:
after a container is detected by the inlet sensor, control the inlet door to close while keeping the outlet door closed, control the RFID reader to transmit a radio wave via the antenna, and identify an RFID-tagged article stored in the container according to a change in a response wave received by the RFID reader from an RFID tag of the RFID-tagged article via the antenna, corresponding to a movement of the RFID-tagged article from the inlet end to the outlet end,
after the RFID-tagged article is identified for registration, control the outlet door to open, and
when the container is detected by the outlet sensor and is subsequently not detected for a predetermined time, control the outlet door to close.

2. The tag reading apparatus according to claim 1, further comprising:
a display positioned to be visible to a user standing next to the passage, wherein
the controller is further configured to control the display to display information about a state of the RFID tag reader.

3. The tag reading apparatus according to claim 2, wherein the display is on an upper end of a wall forming the passage.

4. The tag reading apparatus according to claim 1, further comprising:
a communication interface configured to communicate with an external settlement apparatus, wherein
the controller is configured to send transaction information including an identity of the RFID-tagged article to the external settlement apparatus via the communication interface.

5. The tag reading apparatus according to claim 1, wherein
the passage comprises first and second walls spaced from each other in the second direction, and
the first wall has a height suitable for a user to place the container in the passage and move the container from the inlet end to the outlet end.

6. The tag reading apparatus according to claim 5, further comprising:
a display on an upper end of the first wall positioned to be visible to the user standing next to the passage, wherein
the controller is configured to control the display to display information about a state of the RFID tag reader.

7. The tag reading apparatus according to claim 5, wherein one side of the roof is attached to the second wall such that the roof is rotatable.

8. The tag reading apparatus according to claim 5, wherein the container is a shopping basket.

9. The tag reading apparatus according to claim 1, wherein the change in the response wave corresponding to the movement of the RFID-tagged article from the inlet end to the outlet end is a difference in the phase of the response wave and the phase of a tag interrogation wave over time.

10. The tag reading apparatus according to claim 1, wherein the change in the response wave corresponding to the movement of the RFID-tagged article from the inlet end to the outlet end is a change in received signal intensity of the response wave over time.

11. A tag reading system, comprising:
a tag reading apparatus including:
a passage through which a container storing an RFID-tagged article to be registered in a transaction can pass, the passage having an inlet end and an outlet end separated from each other in a first direction and a width in a second direction perpendicular to the first direction;
an inlet door at the inlet end of the passage;
an inlet sensor adjacent to the inlet door and configured to detect a presence of the container at the inlet end of the passage;
an outlet door at the outlet end of the passage;
an outlet sensor adjacent to the outlet door and configured to detect a presence of the container at the outlet end of the passage;
a roof by which an opening above the passage is at least partially covered and including a material capable of absorbing a radio wave;
an RFID reader having an antenna in the passage at a position between the inlet and outlet ends in the first direction; and
a controller configured to:
after a container is detected by the inlet sensor, control the inlet door to close while keeping the outlet door closed, control the RFID reader to transmit a radio wave via the antenna, and identify an RFID-tagged article stored in the container according to a change in a response wave received by the RFID reader from an RFID tag of the RFID-tagged article via the antenna, corresponding to a movement of the RFID-tagged article from the inlet end to the outlet end,
after the RFID-tagged article is identified for registration, control the outlet door to open, and
when the container is detected by the outlet sensor and is subsequently not detected for a predetermined time, control the outlet door to close; and
a settlement terminal configured to receive transaction information about the identified RFID-tagged article from the tag reading apparatus and process a transaction settlement according to the received transaction information.

12. The tag reading system according to claim 11, wherein the change in the response wave corresponding to the movement of the RFID-tagged article from the inlet end to the outlet end is a difference in the phase of the response wave and the phase of a tag interrogation wave over time.

13. The tag reading system according to claim 12, wherein
the passage comprises first and second walls spaced from each other in the second direction, and
the first wall has a height suitable for a user to place the container in the passage and move the container from the inlet end to the outlet end.

14. The tag reading system according to claim 13, wherein
the tag reading apparatus further includes a display on an upper end of the first wall positioned to be visible to the user standing next to the passage, and
the controller is configured to control the display to display information about a state of the RFID tag reader.

15. The tag reading system according to claim 13, wherein one side of the roof is attached to the second wall such that the roof is rotatable.

16. The tag reading system according to claim 11, wherein the change in the response wave corresponding to the movement of the RFID-tagged article from the inlet end to the outlet end is a change in received signal intensity of the response wave over time.

\* \* \* \* \*